United States Patent
Wang et al.

(10) Patent No.: US 12,459,364 B2
(45) Date of Patent: Nov. 4, 2025

(54) DRIVERLESS POWER SUPPLY SYSTEM, POWER SUPPLY CONTROL METHOD, POWER DOMAIN CONTROLLER AND VEHICLE

(71) Applicant: Beijing Baidu Netcom Science Technology Co., Ltd., Beijing (CN)

(72) Inventors: Ganghui Wang, Beijing (CN); Zhihua Yu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 617 days.

(21) Appl. No.: 17/846,952

(22) Filed: Jun. 22, 2022

(65) Prior Publication Data

US 2023/0011671 A1    Jan. 12, 2023

(30) Foreign Application Priority Data

Jun. 30, 2021    (CN) .......................... 202110739407.6

(51) Int. Cl.
| | |
|---|---|
| *B60L 3/00* | (2019.01) |
| *B60L 58/15* | (2019.01) |
| *B60L 58/18* | (2019.01) |

(52) U.S. Cl.
CPC ........... *B60L 3/0046* (2013.01); *B60L 3/0092* (2013.01); *B60L 58/15* (2019.02); *B60L 58/18* (2019.02); *B60L 2210/10* (2013.01)

(58) Field of Classification Search
CPC ........ B60L 3/0046; B60L 58/18; B60L 58/15; B60L 3/0092; B60L 2210/10
See application file for complete search history.

(56) References Cited

U.S. PATENT DOCUMENTS

| | | | |
|---|---|---|---|
| 11,891,194 B1 * | 2/2024 | Baderman | B60L 58/10 |
| 2015/0274027 A1 * | 10/2015 | Crombez | B60L 58/12 |
| | | | 903/903 |

(Continued)

FOREIGN PATENT DOCUMENTS

| | | |
|---|---|---|
| CN | 108482154 A | 9/2018 |
| CN | 112389199 A | 2/2021 |

(Continued)

OTHER PUBLICATIONS

Extended Search Report of the counterpart EP application No. 22181172.2 issued on Nov. 29, 2022 (8 pages).

(Continued)

*Primary Examiner* — Peter D Nolan
*Assistant Examiner* — Wae L Louie
(74) *Attorney, Agent, or Firm* — ArentFox Schiff LLP

(57) ABSTRACT

The present disclosure provides a driverless power supply system, a power supply control method, a power domain controller and a vehicle, which relate to the technical field of intelligent traffic, and particularly relate to the technical field of driverless driving. The system includes: a high-voltage battery box, a direct current converter, a main storage battery, a standby storage battery, a power domain controller and an electrical load; the direct current converter is connected with the high-voltage battery box and the electrical load through wires; the main storage battery is respectively connected with the direct current converter and the electrical load through wires; the standby storage battery is respectively connected with the direct current converter and the electrical load through wires; and the power domain controller is respectively connected with the direct current converter, the main storage battery and the standby storage battery through data wires.

19 Claims, 5 Drawing Sheets

(56) References Cited

U.S. PATENT DOCUMENTS

| | | | |
|---|---|---|---|
| 2018/0029474 | A1* | 2/2018 | Berels ............... B60L 58/15 |
| 2020/0136427 | A1* | 4/2020 | Heinrich ............ G06F 1/263 |
| 2021/0086655 | A1 | 3/2021 | Li |
| 2021/0276425 | A1* | 9/2021 | Gauthier ............ H02J 7/0063 |
| 2022/0065946 | A1* | 3/2022 | Kwon ................ B60L 58/20 |
| 2022/0089030 | A1* | 3/2022 | Norberg ............. H02J 7/1423 |
| 2022/0266777 | A1* | 8/2022 | Naizghi ............. B60L 50/66 |
| 2023/0011671 | A1* | 1/2023 | Wang ................ B60L 3/0046 |
| 2023/0031709 | A1* | 2/2023 | Yu .................. B60W 60/0016 |
| 2023/0077522 | A1* | 3/2023 | Takahashi .......... B60L 3/0092 307/10.1 |
| 2023/0318350 | A1* | 10/2023 | Motofusa ........... H02J 1/00 307/11 |
| 2024/0001765 | A1* | 1/2024 | Wang ................ H02J 9/06 |
| 2024/0001767 | A1* | 1/2024 | Lo Calzo ........... B60R 16/03 |
| 2024/0100991 | A1* | 3/2024 | Bloom ............... B60L 58/16 |
| 2024/0195197 | A1* | 6/2024 | Bennett ............. B60L 53/305 |
| 2024/0375545 | A1* | 11/2024 | Sorani .............. B60L 58/20 |

FOREIGN PATENT DOCUMENTS

| | | |
|---|---|---|
| CN | 112400264 A | 2/2021 |
| CN | 112543717 A | 3/2021 |
| CN | 215904319 U | 2/2022 |
| DE | 112019004360 T5 | 6/2021 |
| EP | 3354520 A1 | 8/2018 |
| EP | 3616971 A1 | 3/2020 |
| EP | 3616973 A1 | 3/2020 |
| JP | 2019186975 A | 10/2019 |
| JP | 2020036448 A | 3/2020 |
| JP | 2020036464 A | 3/2020 |
| JP | 2020036465 A | 3/2020 |

OTHER PUBLICATIONS

The First Office Action of the counterpart JP application No. 2022-101905 issued on Apr. 25, 2023 (9 pages).

The First Search Report of the counterpart CN application No. 202110739407.6 issued in May 19, 2024.

* cited by examiner

DRIVERLESS POWER SUPPLY SYSTEM, POWER SUPPLY CONTROL METHOD, POWER DOMAIN CONTROLLER AND VEHICLE

CROSS-REFERENCE TO RELATED APPLICATIONS

The present application claims priority of to Chinese Patent Application No. 202110739407.6, filed on Jun. 30, 2021, the disclosure of which is hereby incorporated by reference in entirety.

TECHNICAL FIELD

The present disclosure relates to the technical field of intelligent traffic, and in particular to the technical field of driverless.

BACKGROUND

With the development of intelligent traffic technology, driverless has attracted extensive attention. Since a driverless vehicle operates unattended, the driverless places higher requirements on the safety of the power supply of the driverless vehicle.

SUMMARY

At least some embodiments of the present disclosure provide a driverless power supply system, a power supply control method, a power domain controller and a vehicle.

In an embodiment of the present disclosure, a driverless power supply system is provided, including: a high-voltage battery box, a direct current converter, a main storage battery, a standby storage battery, a power domain controller and an electrical load;
  the direct current converter is respectively connected with the high-voltage battery box and the electrical load through wires;
  the main storage battery is respectively connected with the direct current converter and the electrical load through wires;
  the standby storage battery is respectively connected with the direct current converter and the electrical load through wires; and
  the power domain controller is respectively connected with the direct current converter, the main storage battery and the standby storage battery through data wires.

In another embodiment of the present disclosure, a driverless power supply control method is provided, which is applied to a power domain controller in the described driverless power supply system and includes that:
  detecting a power supply state of each of multiple batteries on a driverless vehicle, the multiple batteries including a direct current converter, a main storage battery and a standby storage battery;
  in response to detecting that the power supply state of any one of the multiple batteries is a failure state, cutting off a power supply circuit of one battery, of which the power supply state is the failure state.

In another embodiment of the present disclosure, a power domain controller is provided, including:
  at least one processor;
  a memory communicatively connected with the at least one processor; and
  the memory is configured to store instructions executable by the at least one processor, the instructions, when executed by the at least one processor, enabling the at least one processor to execute the power supply control method mentioned above.

It should be appreciated that the content is described in this section is not intended to identify key or critical features of embodiments of the disclosure, nor to limit the scope of the disclosure. Other features of the present disclosure will become readily apparent from the following description.

BRIEF DESCRIPTION OF THE DRAWINGS

The accompanying drawings are used for better understanding the present solution, and do not constitute limitations to the present disclosure. In the drawings.

DETAILED DESCRIPTION

Exemplary embodiments of the present disclosure will be described below with reference to the accompanying drawings, in which various details of the embodiments of the present disclosure are included to facilitate understanding, and should be considered as exemplary. Accordingly, those of ordinary skilled in the art will recognize that various changes and modifications of the embodiments described herein are made without departing from the scope and spirit of the disclosure. In addition, descriptions of well-known functions and constructions are omitted in the following description for clarity and conciseness.

The embodiments in the present disclosure and the features in the embodiments are combined with each other without conflict. The present disclosure will be described below with reference to the drawings and embodiments in detail.

As driverless vehicles operate unattended, the requirement of driverless vehicles for power supply safety is much higher than the requirement of driver driving for power supply safety.

Figure 1:
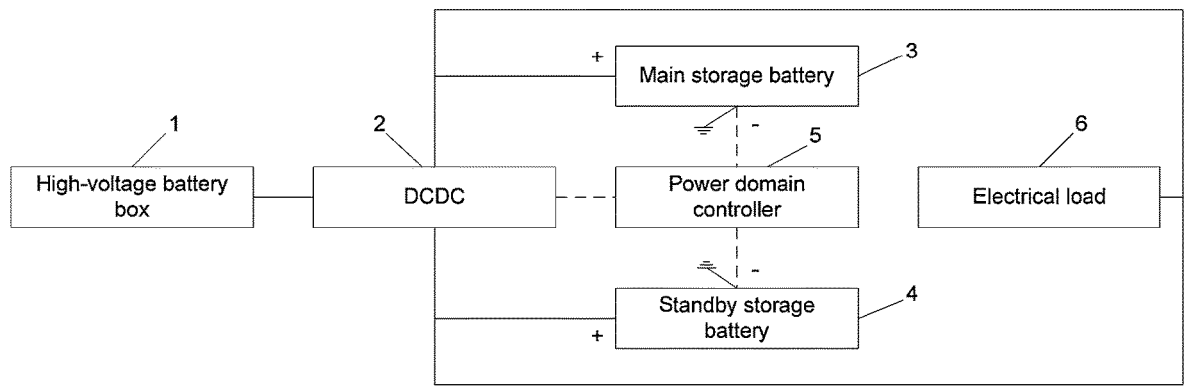
FIG. 1 is a structural schematic diagram of an unmanned aerial vehicle system according to a first embodiment of the present disclosure.

There is no redundant power supply design in the related art, which cannot meet the safety requirements of driverless power supply. On the basis of this, an embodiment of the present disclosure provides a driverless power supply system, as shown in FIG. 1. The power supply system is applied to a driverless vehicle, and includes a high-voltage battery box 1, a direct current converter (DC-to-DC converter) 2, a main storage battery 3, a standby storage battery 4, a power domain controller 5 and an electrical load 6.

The high-voltage battery box 1 is configured to output high-voltage electricity and provide power supply for a power system of a driverless vehicle, so as to drive the driverless vehicle to move.

The DCDC 2 is respectively connected with the high-voltage battery box 1 and the electrical load 6 through wires.

The main storage battery 3 is respectively connected with the DCDC 2 and the electrical load 6 through wires.

The standby storage battery 4 is respectively connected with the DCDC 2 and the electrical load 6 through wires.

The power domain controller 5 is respectively connected with the DCDC 2, the main storage battery 3 and the standby storage battery 4 through data wires. In an embodiment of the present disclosure, the power domain controller is a vehicle and battery control unit (VBU), and the VBU includes a vehicle control unit and a battery management system.

In an embodiment of the present disclosure, the CDC 2 is configured to convert a high voltage output by the high-voltage battery box 1 into a low voltage, so as to provide a power supply for the electrical load 6. Herein, the DCDC 2 is equivalent to a low-voltage battery. In addition, the power supply system is also arranged with redundant power supplies, i.e. a main storage battery 3 and a standby storage battery 4. The main storage battery 3 and the standby storage battery 4 are low-voltage batteries, and are configured to assist the DCDC 2 to supply power to the electrical load 6, such that the power supply of the entire power supply system is stable.

In an embodiment of the present disclosure, in addition to the high-voltage battery box 1, the power supply system is additionally arranged with a main storage battery 3 and a standby storage battery 4. In this case, a failure mode of the power supply system is shown in Table 1.

TABLE 1

| Mode | DCDC | main storage battery | standby storage battery | power supply system state |
|------|------|---------------------|------------------------|---------------------------|
| Mode 1 | failure | normal | normal | normal |
| Mode 2 | failure | failure | normal | normal |
| Mode 3 | failure | normal | failure | normal |
| Mode 4 | failure | failure | failure | abnormal |
| Mode 5 | normal | failure | normal | normal |
| Mode 6 | normal | normal | failure | normal |
| Mode 7 | normal | normal | normal | normal |

As shown in Table 1 above, in the mode 4, the state of the power supply system is abnormal, that is, the power supply system fails to work. The probability of occurrence of mode 4 is 1/7=14.3%. Therefore, the failure probability of the power supply system provided in at least some embodiments of the present disclosure is 1/7=14.3%.

The power supply system in the related art is not additionally arranged with the main storage battery and the standby storage battery. In the power supply system, when the DCDC fails to work, the entire power supply system fails to work. When the DCDC is normal to work, the entire power supply system is normal to work. Therefore, the failure probability of the power supply system is 1/2=50%.

Since 14.3%<50%, the power supply system provided in the at least some embodiments of the present disclosure greatly reduces the failure probability of the power supply system, and increases the safety of the power supply system.

In an embodiment of the present disclosure, the DCDC 2 is connected with the high-voltage battery box 1 through wires, so as to convert high-voltage electricity output by the high-voltage battery box 1 into low-voltage electricity. The DCDC 2 is connected with the electrical load 6 through wires and transmits the low-voltage electricity to the electrical load 6. In this way, the high-voltage battery box 1 can supply power for the electrical load 6.

In a driverless vehicle, the electrical load 6 includes, but not limited to, lights, steering, braking, SOS remote calls, entertainment systems, air conditioners, various driverless sensors, and the like. At different times, electrical loads activated by the driverless vehicle are different. Therefore, the total required power supply voltage of the electrical loads is not completely different at different times.

The main storage battery 3 and the standby storage battery 4 are connected with an electrical load 6 through wires. That is, one pole of the main storage battery 3 and one pole of the standby storage battery 4 are connected with the electrical load 6 through wires, and the other pole of the main storage battery 3 and the other pole of the standby storage battery 4 are grounded. As shown in FIG. 1, a positive pole of the main storage battery 3 and a positive pole of the standby storage battery 4 are connected with the electrical load 6, and a negative pole of the main storage battery 3 and a negative pole of the standby storage battery 4 are grounded. In this way, when the voltage supplied by the high-voltage battery box 1 to the electrical load 6 is insufficient, the main storage battery 3 and the standby storage battery 4 can supplement each other by themselves, ensuring that the voltage supplied by the electrical load 6 is stable, and enabling the electrical load 6 to operate normally.

In an embodiment of the present disclosure, the main storage battery 3 and the standby storage battery 4 are respectively connected with the DCDC 2 through wires. As shown in FIG. 1, a positive pole of the main storage battery 3 and a positive pole of the standby storage battery 4 are connected with the DCDC 2, and a negative pole of the main storage battery 3 and a negative pole of the standby storage battery 4 are grounded.

In this way, when the output voltage of the main storage battery 3 and the output voltage of the standby storage battery 4 are insufficient, the DCDC 2 converts the high voltage point output by the high voltage battery box 1 into low voltage electricity, and then charges the main storage battery 3 and the standby storage battery 4. This ensures that the main storage battery 3 and the standby storage battery 4 can normally supply power to the electrical load 6, further reduces the failure probability of the power supply system, and increases the safety of the power supply system.

As described above, the condition that the positive pole of the main storage battery 3 and the positive pole of the standby storage battery 4 are connected with the DCDC 2 and the electrical load 6, and the negative pole of the main storage battery and the negative pole of the standby storage battery are grounded is taken as an example. In another embodiment of the present disclosure, the negative pole of the main storage battery 3 and the negative pole of the standby storage battery 4 are connected with the DCDC 2 and the electric load 6, and the positive pole of the main storage battery 3 and the positive pole of the standby storage battery 4 are grounded, which is not limited herein.

In an embodiment of the present disclosure, the power domain controller 5 is respectively connected with the DCDC 2, the main storage battery 3 and the standby storage battery 4 through data wires. In this case, the power domain controller 5 separately collects power supply state signals from the DCDC 2, the main storage battery 3, and the standby storage battery 4 through data wires, and then determine, based on the power supply state signals, whether the DCDC 2, the main storage battery 3 and the standby storage battery 4 fail to work, and execute corresponding processing, thereby further reducing the failure probability of the power supply system, and improving the security of the power supply system.

The power supply state signal of the DCDC 2 includes, but not limited to, an output voltage and a resistor. In one example, the power domain controller 5 and the DCDC 2 are connected through low order data wires (i.e. CAN_L) and a high order data wires (i.e. CAN_H) of a controller area network (CAN). The power domain controller 5 achieves the collection of power source state signals, such as an output voltage and a resistance, of the DCDC 2 through CAN_L and CAN_H.

The power state signals of the main storage battery 3 and the standby storage battery 4 includes, but not limited to, the remaining power and output voltage of the batteries. In an embodiment of the present disclosure, the power domain controller 5 acquires the power state signals of the main storage battery 3 and the standby storage battery 4 by arranging a power sensor or a voltage sensor on the main storage battery 3 and the standby storage battery 4, which will be described in detail below, and will not be introduced here. For the convenience of distinguishing, the power supply state signal of the main storage battery 3 is referred to as a first power supply state signal, and the power supply state signal of the standby storage battery 3 is referred to as a second power supply state signal.

Figure 2:
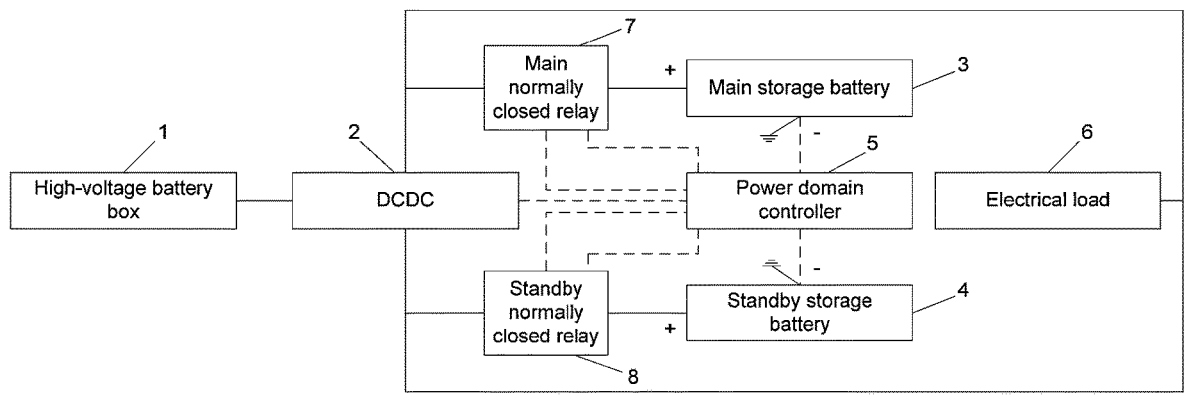
FIG. 2 is a structural schematic diagram of an unmanned aerial vehicle system according to a second embodiment of the present disclosure.

In an embodiment of the present disclosure, as shown in FIG. 2, the power supply system further includes a main normally closed relay 7 and a standby normally closed relay 8. The main storage battery 3 is respectively connected with the DCDC 2 and the electrical load 6 through a main normally closed relay 7, and the standby storage battery 4 is respectively connected with the DCDC 2 and the electrical load 6 through a standby normally closed relay 8.

The power domain controller supplies power to the main normally closed relay 7 and the standby normally closed relay 8, so as to control the main normally closed relay 7 and the standby normally closed relay 8 to be opened. When the main normally closed relay 7 is opened, a connection between the main storage battery 3 and the DCDC 2 is disconnected, and a connection between the main storage battery 3 and the electrical load 6 is also disconnected. When the standby normally closed relay 8 is opened, a connection between the standby storage battery 4 and the DCDC 2 is disconnected, and a connection between the standby storage battery 4 and the electrical load 6 is also disconnected.

In an embodiment of the present disclosure, the main normally closed relay 7 is connected in series between the main storage battery 3 and the DCDC 2, and the main normally closed relay 7 is connected in series between the main storage battery 3 and the electrical load 6. The standby normally closed relay 8 is connected in series between the standby storage battery 4 and the DCDC 2, and the standby normally closed relay 8 is connected in series between the standby storage battery 4 and the electrical load 6.

When the power domain controller 5 does not supply power to the main normally closed relay 7, the main normally closed relay 7 is in a closed state, the main storage battery 3 supplies power to the electrical load 6, and the DCDC 2 charges the main storage battery 3.

When the power domain controller 5 does not supply power to the standby normally closed relay 8, the standby normally closed relay 8 is in a closed state, the standby storage battery 4 supplies power to the electrical load 6, and the DCDC 2 charges the standby storage battery 4.

When the power domain controller 5 supplies power to the main normally closed relay 7, the main normally closed relay 7 is in an open state, the connection between the main storage battery 3 and the DCDC 2 is disconnected, and the connection between the main storage battery 3 and the electrical load 6 is also disconnected. At this time, the main storage battery 3 cannot supply power to the electrical load 6, and the DCDC 2 cannot charge the main storage battery 3.

When the power domain controller 5 supplies power to the standby normally closed relay 8, the standby normally closed relay 8 is in an open state, the connection between the standby storage battery 4 and the DCDC 2 is disconnected, and the connection between the standby storage battery 4 and the electrical load 6 is also disconnected. In this case, the standby storage battery 4 cannot supply power to the electrical load 6, and the DCDC 2 cannot charge the standby storage battery 4.

In practical applications, after the storage battery fails to work, the resistance of the storage battery is increased, and the storage battery becomes an electrical load having great power consumption in a power supply system. During operation, a faulty storage battery generates heat continuously, which may increase overflow and volatilization of an acid liquid of the storage battery, thereby possibly causing a fire in a driverless vehicle. In addition, the faulty storage battery, as a parallel electrical load, can pull down a voltage of the entire power supply system, thereby shortening a power supply time period of the power supply system.

In an embodiment of the present disclosure, through controlling the main normally closed relay 7, the power domain controller 5 cuts off the power supply of the main storage battery 3 after the main storage battery 3 fails to work, thereby avoiding the probability of fire caused by continuous heating of the failed main storage battery 3, and prolonging the power supply time of the power supply system.

In addition, through controlling the standby normally closed relay 8, the power domain controller 5 cuts off the power supply of the standby storage battery 4 after the standby storage battery 4 fails to work, thereby avoiding the probability of fire caused by continuous heating of the failed standby storage battery 4, and prolonging the power supply time of the power supply system.

Through the described method, a significant risk caused by the failure of the main storage battery 3 and the standby storage battery 4 can be effectively avoided.

In another embodiment of the present disclosure, the main normally closed relay 7 is connected in series between the main storage battery 3 and a ground end, and the standby normally closed relay 8 is connected in series between the standby storage battery 4 and the ground end.

When the power domain controller 5 supplies power to the main normally closed relay 7, the main normally closed relay 7 is in an open state, and the connection between the main storage battery 3 and the ground end is disconnected. In this case, a path cannot be formed between the main storage battery 3 and each of the DCDC 2 and the electrical load 6, the main storage battery 3 cannot supply power to the electrical load 6, and the DCDC 2 cannot charge the main storage battery 3.

When the power field controller 5 supplies power to the standby normally closed relay 8, the standby normally closed relay 8 is in an open state, and the connection between the standby storage battery 4 and the ground end is disconnected. In this case, a path cannot be formed between the standby storage battery 4 and each of the DCDC 2 and the electrical load 6, the standby storage battery 4 cannot supply power to the electrical load 6, and the DCDC 2 cannot charge the main storage battery 3.

Through the described method, a significant risk caused by the failure of the main storage battery 3 and the standby storage battery 4 can be effectively avoided.

In an embodiment of the present disclosure, the main storage battery 3 and the standby storage battery 4 can also be connected with the DCDC 2 and the electrical load 6 respectively through normally opening a relay or by other means, which is not limited herein.

Figure 3:
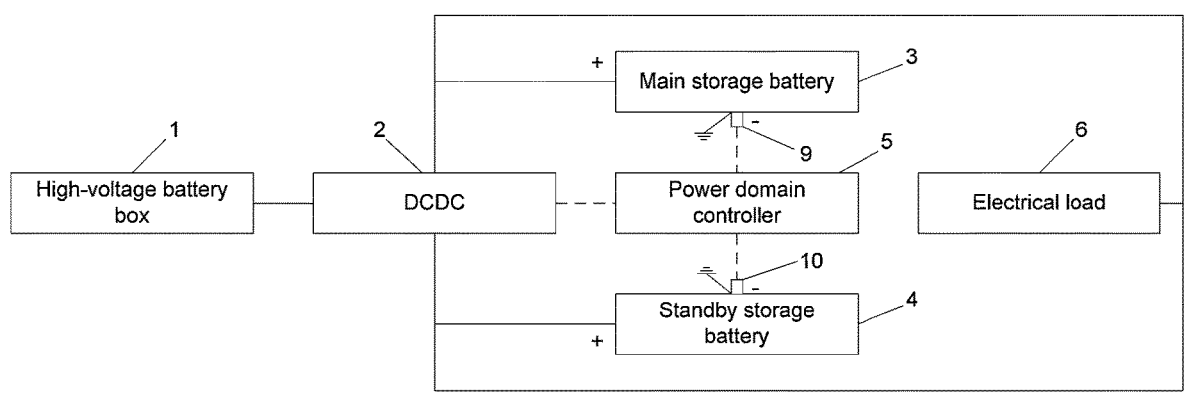
FIG. 3 is a structural schematic diagram of an unmanned aerial vehicle system according to a third embodiment of the present disclosure.

In an embodiment of the present disclosure, a main power sensor 9 is arranged on the main storage battery 3, and a standby power sensor 10 is arranged on the standby storage battery 4. As shown in FIG. 3, the main power sensor 9 is arranged on the negative pole of the main storage battery 3, and the standby power sensor 10 is arranged on the negative pole of the standby storage battery 4. The power domain controller 5 is respectively connected with the main power sensor 9 and the standby power sensor 10 through data wires.

In this case, the main power sensor 9 is configured to collect the first power supply state signal of the main storage battery 3, and then transmits the first power supply state signal to the power domain controller 5 through data wires. The power domain controller 5 is configured to determine a power supply state of the main storage battery 3 according to the first power supply state signal.

The standby power sensor 10 is configured to collect a second power supply state signal of the standby storage battery 4, and then transmit the second power supply state signal to the power domain controller 5 through data wires. The power domain controller 5 is configured to determine the power supply state of the standby storage battery 4 according to the second power source state signal.

The remaining power threshold value may be preset in the power domain controller 5. The power domain controller 5 is configured to remotely control charging and discharging of the main storage battery 3 and the standby storage battery 4 according to the first power state signal and the second power state signal and in combination with the remaining power threshold value. This can solve the problem of automatically supplementing the main storage battery 3 and the standby storage battery 4 with power supply in the case where the main storage battery 3 and the standby storage battery 4 have a risk of power failure due to long standing time of a driverless vehicle.

In an embodiment of the present disclosure, control logic may be pre-stored in the power domain controller 5. The control logic includes state of health thresholds such as the charging and discharging times threshold and the remaining power threshold. The specific control logic includes that: when the charging and discharging times of the storage battery is greater than the charging and discharging times threshold, it is determined that the service life of the storage battery reaches a limit, and this storage battery is required to be replaced with a new storage battery; when the remaining power of the storage battery is lower than a first remaining power threshold, it is determine that the storage battery is required to be charged; and when the remaining power of the storage battery is higher than a second remaining power threshold, it is determined that the charging of the storage battery is finished, and the storage battery being in a discharging state.

The power domain controller 5 manages and controls the remaining power, output voltage, service life and health state of the main storage battery 3 and the standby storage battery 4 according to the first power state signal and the second power state signal in combination with the control logic.

In one embodiment of the present disclosure, the DCDC 2, the main storage battery 3 and the standby storage battery 4 are connected with the power domain controller 5 and each of electrical loads 6 through multiple wires. In this way, power is supplied to the power domain controller 5, such that the power domain controller 5 operates normally, and at the same time, the power domain controller 5 controls the DCDC 2, the main storage battery 3 and the standby storage battery 4 to supply power to each electrical load 6.

For example, the power domain controller 5 is configured to control the DCDC 2, the main storage battery 3, and the standby storage battery 4 to cut off power supply to electrical loads having a non-safety function such as an entertainment system and an air conditioning system. Moreover the power domain controller 5 is configured to supply power for electrical loads having a safety function such as lighting, steering, braking, SOS remote calls, various driverless sensors, and vehicle controllers. The vehicle controller is used for receiving an instruction input by a user to a vehicle network, and then controlling a power supply system through a power domain controller.

The DCDC 2, the main storage battery 3, and the standby storage battery 4 are far away from the electrical load 6. The DCDC 2, the main storage battery 3, the standby storage battery 4, and the electrical load 6 are connected with the power domain controller 5 and each electrical load 6 through multiple wires, which consumes a large number of wires, so that the line deployment of the driverless vehicle is complex and the cost is increased.

Figure 4:
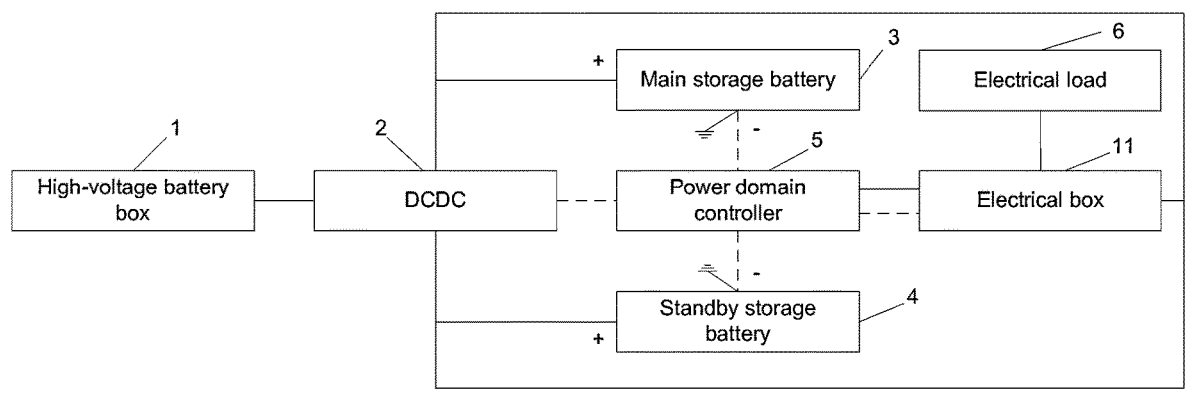
FIG. 4 is a structural schematic diagram of an unmanned aerial vehicle system according to a fourth embodiment of the present disclosure.

In order to reduce wires, simplify line deployment complexity, and reduce costs of a driverless vehicle, in an embodiment of the present disclosure, the power supply system further includes an electrical box 11, as shown in FIG. 4. A first end of the electrical box 11 is respectively connected with the DCDC 2, the main storage battery 3 and the standby storage battery 4 through wires. A second end of the electrical box 11 is respectively connected with the power domain controller 5 and the electrical load 6 through wires. A third end of the electrical box 11 is connected with the power domain controller 5 through data wires, such that the power domain controller 5 sends a command to the electrical box 11, such as a power supply cut-off instruction described below.

The DCDC 2, the main storage battery 3, and the standby storage battery 4 are electrically connected with the power domain controller 5 and the electrical loads 6 through the electrical box 11.

In an embodiment of the present disclosure, the electrical box 11 is divided into multiple wires respectively connected with the power domain controller 5 and the electrical loads 6. In this way, when any one of the DCDC 2, the main storage battery 3 and the standby storage battery 4 fails to work, the power supply circuit for some electrical loads is cut off through the electrical box 11, thereby achieving automatic control of the power supply. For example, when any one of the DCDC 2, the main storage battery 3 and the standby storage battery 4 fails to work, the power domain controller 5 is configured to cut off power supply to electrical loads having a non-safety function such as an entertainment system and an air conditioning system. Electrical loads having a safety function such as lighting, steering, braking, SOS remote calls, various driverless sensors, and vehicle controllers are preferably powered.

The power cut-off is implemented by a relay in the electrical box 11, or is implemented by other means, which is not limited herein.

The above-described electrical box is divided into a vehicle electrical box and a driverless electrical box. The vehicle electrical box is connected with original vehicle electrical loads such as lighting, steering, braking and SOS remote calls. A driverless electrical box is connected with a driverless electrical load such as various driverless sensors.

Figure 5:
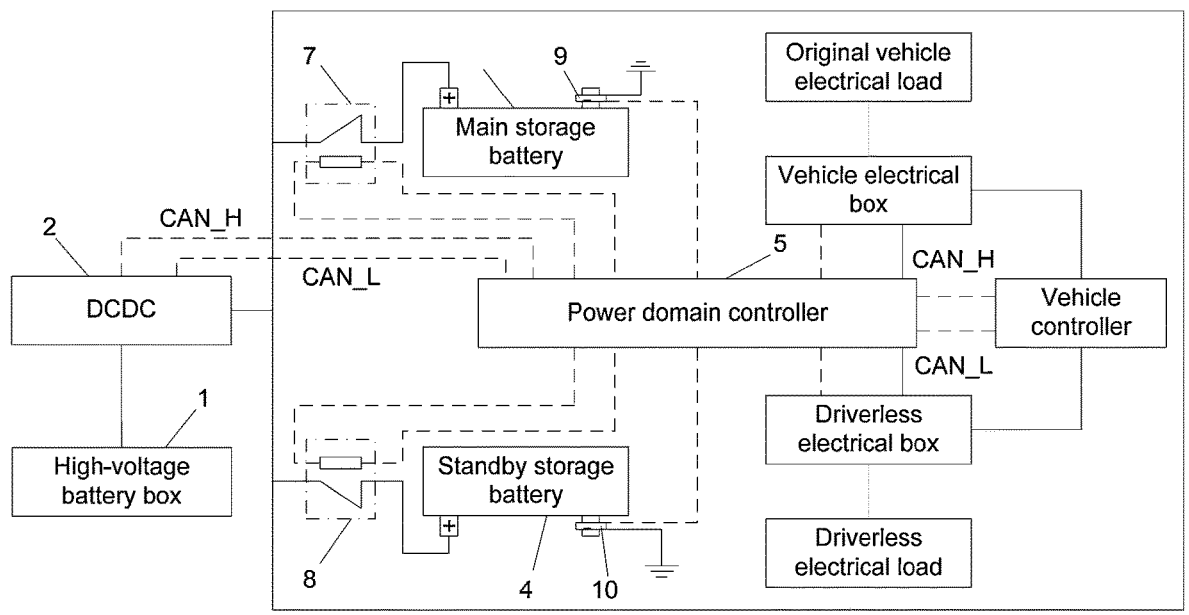
FIG. 5 is a structural schematic diagram of an unmanned aerial vehicle system according to a fifth embodiment of the present disclosure.

The following describes a driverless power supply system provided by an embodiment of the present disclosure in detail with reference to a power supply system shown in FIG. 5.

The power supply system includes a high-voltage battery box 1, a DCDC 2, a main storage battery 3, a standby storage battery 4, a power domain controller 5, a main normally closed relay 7, a standby normally closed relay 8, a main power sensor 9, a standby power sensor 10, a vehicle electrical box (not shown in the figure), a driverless electrical box (not shown in the figure), an original vehicle electrical load (not shown in the figure), a driverless electrical load (not shown in the figure) and a vehicle controller (not shown in the figure).

The vehicle controller is a chip controller such as an HW3.0 or an HW6.0. For the connection relationship and use of the above-mentioned various devices, reference can be made to the description in the parts in FIGS. 1-5, and details are not repeatedly described herein.

In an embodiment of the present disclosure, in FIGS. 1-5, a solid line represents a wire for supplying power, and a thin line represents a data wire for transmitting a control signal.

Figure 6:
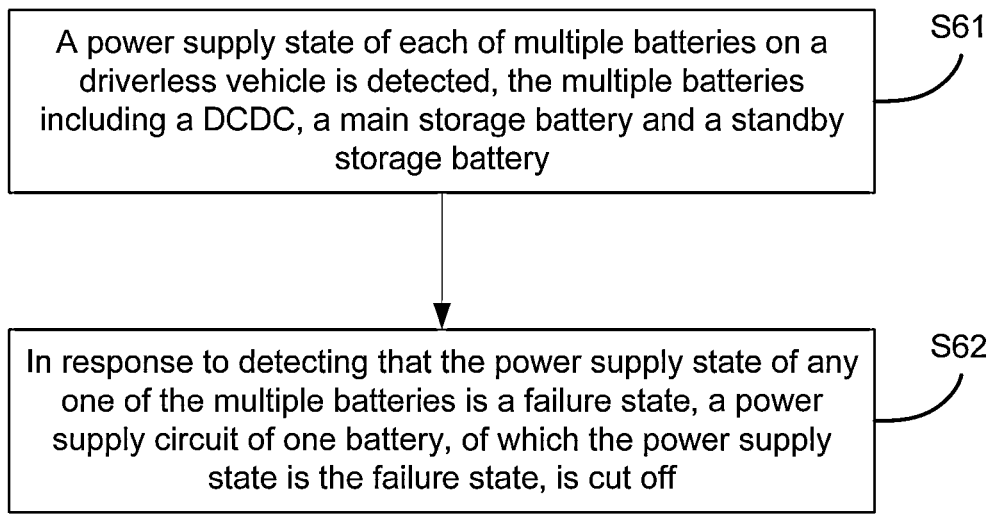
FIG. 6 is a flowchart of a driverless power supply control method according to a first embodiment of the present disclosure.

On the basis of the described driverless power supply system, an embodiment of the present disclosure provides a driverless power supply control method applied to a power domain controller in the driverless power supply system, as shown in FIG. 6, including the following steps.

In Step S61, a power supply state of each of multiple batteries on a driverless vehicle is detected, the multiple batteries including a DCDC, a main storage battery and a standby storage battery.

In an embodiment of the present disclosure, the multiple batteries are multiple low-voltage power supplies connected with the power domain controller, i.e., the DCDC, the main storage battery and the standby storage battery. The power supply state includes a failure state and a normal state. The failure state indicates that the battery fails to work, and the normal state indicates that the battery does not fail to work.

The DCDC, the main storage battery and the standby storage battery transmit power supply state signals to the power domain controller through data wires between the power domain controller and each of the DCDC, the main storage battery and the standby storage battery. The power domain controller determines a power supply state of each of the multiple batteries on the driverless vehicle according to the power state signals of the DCDC, the main storage battery and the standby storage battery.

In Step S62, in response to detecting that the power supply state of any one of the multiple batteries is a failure state, a power supply circuit of one battery, of which the power supply state is the failure state, is cut off.

In an embodiment of the present disclosure, in response to detecting that the power supply state of any one of the multiple batteries is the failure state, the power domain controller switches the power supply circuit of one battery, of which the power supply state is the failure state. That is, the battery does not supply power to the electrical load any more.

In the power supply system provided in an embodiment of the present disclosure, the main storage battery and the standby storage battery are arranged in this power supply system, thereby greatly reducing the failure probability of the power supply system and increasing the safety of the power supply system. In addition, when any one of the multiple batteries fails to work, the power domain controller cuts off a power supply circuit of this one battery, thereby avoiding the probability of fire caused by continuous heating of a failed battery, prolonging a power supply time period of the power supply system, and effectively avoiding a significant risk caused by battery failure.

For example, when the DCDC fails to work, the DCDC sends a power state signal indicating the failure state to the power domain controller through a CAN bus. The power domain controller determines that the DCDC fails according to the power state signal indicating that the DCDC is in the failure state. That is, any one of the multiple batteries described above is the DCDC, and the power domain controller further determines that there is a high-voltage safe failure and danger in the driverless vehicle, and cuts off the power supply of the DCDC, such that the driverless vehicle is in a high-voltage cut-off state. In this case, since the power supply of the DCDC is cut off, the high voltage battery box has no high voltage output, the driverless vehicle has no power output, and the vehicle moves by inertia.

In an example, when the DCDC fails to work, the power domain controller controls the steering and braking system to act, such that the vehicle is transferred to an emergency lane and a safe area on the roadside, thereby preventing the vehicle from stopping at the center of the road and causing a traffic accident.

Figure 7:
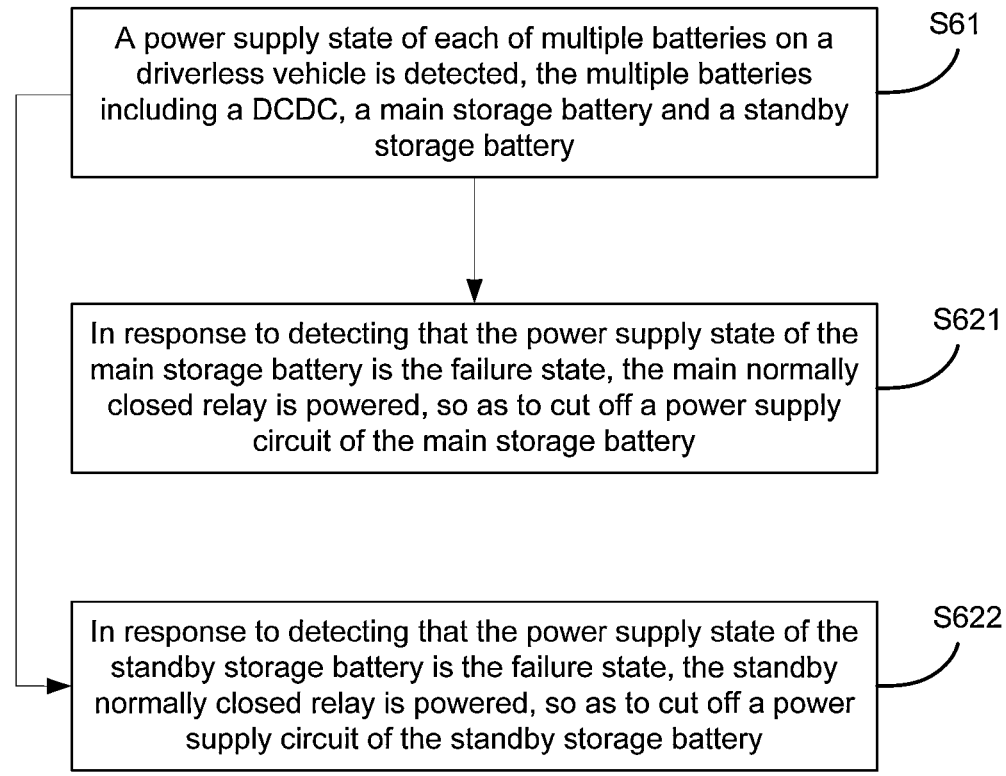
FIG. 7 is a flowchart of a driverless power supply control method according to a second embodiment of the present disclosure.

In an embodiment of the present disclosure, when the driverless power supply system is arranged with a main normally closed relay and a standby normally closed relay, as shown in FIG. 7, the above step S62 is further divided into the following steps.

In Step S621, in response to detecting that the power supply state of the main storage battery is the failure state, the main normally closed relay is powered, so as to cut off a power supply circuit of the main storage battery.

In Step S622, in response to detecting that the power supply state of the standby storage battery is the failure state, the standby normally closed relay is powered, so as to cut off a power supply circuit of the standby storage battery.

The connection relationship between the main normally closed relay and the standby normally closed relay is as shown in FIG. 2. When the power domain controller does not supply power to the main normally closed relay and the standby normally closed relay, the main normally closed relay 7 and the standby normally closed relay are in a closed state. When the power domain controller supplies power to the main normally closed relay and the standby normally closed relay, the main normally closed relay and the standby normally closed relay are in an open state, the connection between each of the main storage battery and the standby storage battery and each of the DCDC and the electrical load is disconnected, and the main storage battery and the standby storage battery cannot supply power to the electrical load.

In an embodiment of the present disclosure, through controlling the main normally closed relay and the standby normally closed relay, the power domain controller cuts off power supply of the main storage battery and the standby storage battery after the main storage battery and the standby storage battery fail to work, thereby avoiding the probability of fire caused by continuous heating of the main storage battery and the standby storage battery, prolonging the power supply time period of the power supply system, and effectively avoiding the major risk caused by the failure of the main storage battery and the standby storage battery.

Figure 8:
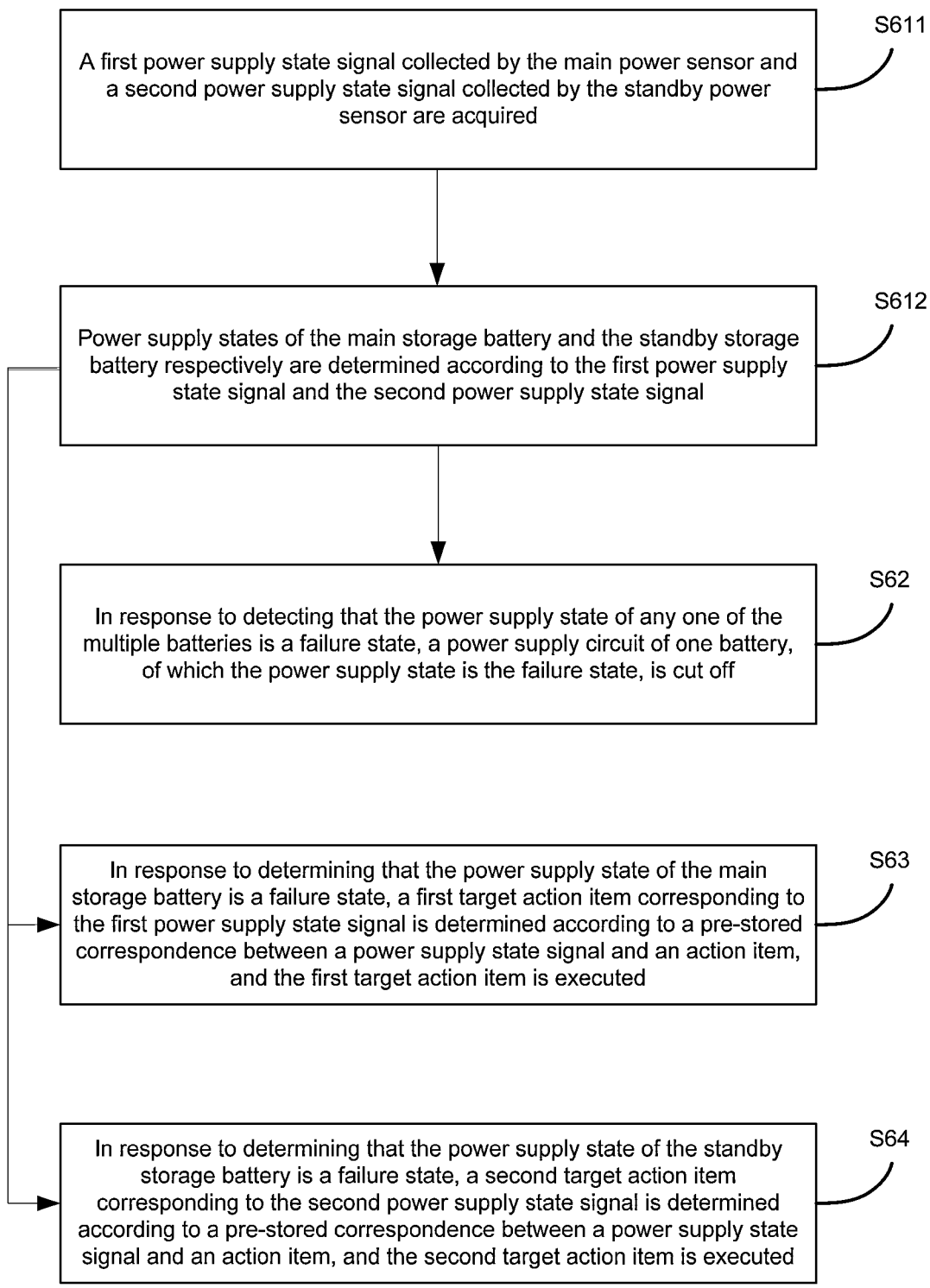
FIG. 8 is a flowchart of a driverless power supply control method according to a third embodiment of the present disclosure.

In an embodiment of the present disclosure, when the main power sensor is arranged on the main storage battery, and the standby power sensor is arranged on the standby storage battery, as shown in FIG. 8, step S61 is further divided into step S611 and step S612. In this case, the power supply control method further includes steps S63 and S64.

In Step S611, a first power supply state signal collected by the main power sensor and a second power supply state signal collected by the standby power sensor are acquired.

In Step S612, power supply states of the main storage battery and the standby storage battery respectively are determined according to the first power supply state signal and the second power supply state signal.

For example, when the first power supply state signal indicates that an output voltage is 0, the power supply state of the main storage battery is determined to fail to work.

In Step S63, in response to determining that the power supply state of the main storage battery is a failure state, a first target action item corresponding to the first power supply state signal is determined according to a pre-stored correspondence between a power supply state signal and an action item, and the first target action item is executed.

In Step S64, in response to determining that the power supply state of the standby storage battery is a failure state, a second target action item corresponding to the second power supply state signal is determined according to a pre-stored correspondence between a power supply state signal and an action item, and the second target action item is executed.

In an embodiment of the present disclosure, according to the first power supply state signal and the second power supply state signal, the power supply states of the main storage battery and the standby storage battery, the high voltage state of the entire power supply system, and the state of the power supply system are determined.

The above-mentioned action items are set according to practical requirements. For example, when the first power state signal indicates failure of the main storage battery, the action item is configured to output an alarm for failure of the main storage battery. When the second power state signal indicates failure of the standby storage battery, the action item is configured to output an alarm for failure of the standby storage battery.

In addition, the first power supply state signal and the second power supply state signal further indicate a security level of the power supply system due to at least one of the main storage battery and standby storage battery failing to work. At this time, whether the requirement for continuing driving is satisfied is determined according to different security levels. When the security level satisfies a requirement for continuing driving, the action item corresponding to the power supply state signal indicating the security level is configured to continue driving; otherwise, the action item is configured to stop driving.

After the correspondence between each power supply state signal and each action item is pre-configured, the power domain controller can quickly execute a first target action item corresponding to the first power supply state signal and a second target action item corresponding to the second power supply state signal, so as to avoid a safety problem caused by a strong driving.

In an embodiment of the present disclosure, the power supply state signal includes the output voltage of the main storage battery. That is, the first power supply state signal indicates the output voltage of the main storage battery, and the second power supply state signal indicates the output voltage of the standby storage battery.

In the case where the main storage battery is normal, when the first power supply state signal indicates that the output voltage of the main storage battery is lower than the preset voltage threshold, and the power supply system satisfies the charging condition, that is, in the case where the DCDC is normal and there is no high voltage security problem, and there is no security failure, the power domain controller sends a charging request to the DCDC through data wires so as to wake up the DCDC, and then the high voltage power supply box charges the main storage battery through DCDC.

When the standby storage battery is normal, when the second power supply state signal indicates that the output voltage of the main storage battery is lower than the preset voltage threshold, and the power supply system satisfies a charging condition, the power domain controller sends a charging request to the DCDC through data wires so as to wake up the DCDC, and then the DCDC converts high voltage output by the high voltage power supply box into low voltage so as to charge the standby storage battery.

After the main storage battery and the standby storage battery meet the requirements of voltage and power, the charging ends. At this time, the power supply system enters a sleep mode.

It can be determined that, in an embodiment of the present disclosure, the power domain controller monitors the main storage battery and the standby storage battery through the electric quantity sensor, so as to achieve automatic charging of the main storage battery and the standby storage battery.

In one embodiment of the present disclosure, a first electrical load and a second electrical load corresponding to each battery in the failure state are pre-stored in the power domain controller. The first electrical load is an electrical load required to cut off the power receiving circuit, that is, the first electrical load is an electrical load required to be turned off. The second electrical load is an electrical load required to turn on the power receiving circuit, that is, the second electrical load is an electrical load required to be turned on.

In this case, when any one of the multiple batteries fails to work, the power domain controller sends a power supply cut-off instruction to the electrical box according the first electrical load and the second electrical load corresponding to each battery in the failure state are pre-stored in the power domain controller. According to the power supply cut-off instruction, the electrical box cuts off the power receiving circuit of the first electrical load and turns on the power receiving circuit of the second electrical load.

For example, the following information is pre-stored in the power domain controller.

When the DCDC fails to work, a corresponding first electrical load is empty, and when the DCDC fails to work, the corresponding second electrical load is an electrical load such as lighting, steering, braking, and SOS remote calls.

When at least one of the main storage battery and the standby storage battery fails to work, a corresponding first electrical load is an electrical load with a non-safety function, such as an entertainment system and an air conditioning system. And when at least one of the main storage battery and the standby storage battery fails to work, a corresponding second electrical load is an electrical load having a safety function, such as lighting, steering, braking, SOS remote calls and various driverless sensors.

In this case, when the DCDC fails to work, the power domain controller supplies power to electrical loads such as lighting, steering and braking, and after the driverless vehicle is stationary, the electrical load such as the SOS remote call is turned on.

When at least one of the main storage battery and the standby storage battery fails to work, the power domain controller cuts off the electrical load having non-safety functions such as entertainment systems and air conditioning systems, and maintains the electrical loads having safety functions such as lighting, steering, braking, SOS remote calls, power receiving circuits and various driverless sensors in a connected state, so that the electrical loads having corresponding safety functions are turned on when required, thereby improving the completeness of driverless driving.

Figure 9:
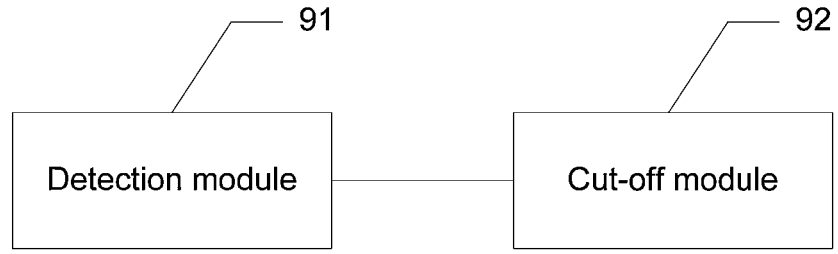
FIG. 9 is a structural schematic diagram of a driverless power supply control apparatus according to an embodiment of the present disclosure.

Based on the driverless power supply control method mentioned above, an embodiment of the present disclosure further provides a driverless power supply control apparatus applied to a power domain controller in the described driverless power supply system, as shown in FIG. 9, including:
- a detection module 91, configured to detect a power supply state of each of multiple batteries on a driverless vehicle, the multiple batteries including a direct current converter, a main storage battery and a standby storage battery a cut-off module 92, configured to, in response to detecting that the power supply state of any one of the multiple batteries is a failure state, cut off a power supply circuit of one battery, of which the power supply state is the failure state.

In an embodiment of the present disclosure, when the driverless power supply system is arranged with a main normally closed relay and a standby normally closed relay, the cut-off module 92 is further configured to:
when the one battery is the main storage battery, supply power to the main normally closed relay, so as to cut off a power supply circuit of the main storage battery; when the one battery is the standby storage battery, supply power to a control unit of the standby normally closed relay, so as to cut off a power supply circuit of the standby storage battery.

In an embodiment of the present disclosure, the detection module 91 is further configured to acquire a first power supply state signal collected by the main power sensor and a second power supply state signal collected by the standby power sensor, and respectively determine, according to the first power supply state signal and the second power supply state signal, power supply states of the main storage battery and the standby storage battery.

The power supply control apparatus further includes:
a determination module, configured to, in response to determining that the power supply state of the main storage battery is a failure state, determine, according to a pre-stored correspondence between a power supply state signal and an action item, a first target action item corresponding to the first power supply state signal and execute the first target action item; and in response to determining that the power supply state of the standby storage battery is a failure state, determine, according to the pre-stored correspondence between a power supply state signal and an action item, a second target action item corresponding to the second power supply state signal and execute the second target action item.

In an embodiment of the present disclosure, the power supply control apparatus further includes:
a wake-up module, configured to in response to the first power supply state signal indicating that an output voltage of the main storage battery is lower than a preset voltage threshold, or the second power supply state signal indicating that an output voltage of the standby storage battery is lower than the preset voltage threshold, wake up the direct current converter, so as to charge the main storage battery and the standby storage battery through the direct current converter.

In an embodiment of the present disclosure, the power supply control apparatus further includes:
a sending module, configured to send, according to a pre-stored corresponding first electrical load and second electrical load when the any one of the plurality of batteries does not work, a power supply cut-off instruction to the electrical box, so that the electrical box cuts off a power receiving circuit of the first electrical load according to the power supply cut-off instruction, and turns on a power receiving circuit of the second electrical load.

According to the driverless power supply control apparatus provided in an embodiment of the present disclosure, the main storage battery and the standby storage battery are provided, thereby greatly reducing the failure probability of the power supply system, and improving the safety of the power supply system.

According to some embodiments of the present disclosure, a power domain controller, a readable storage medium and a computer program product are further provided.

Figure 10:
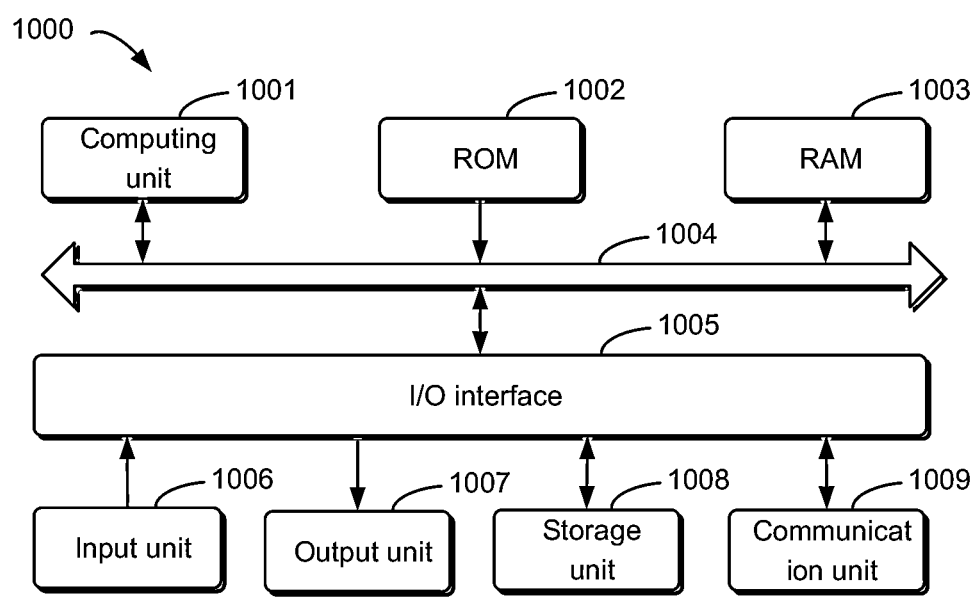
FIG. 10 is a structural schematic diagram of a power domain controller for implementing a driverless power supply control method according to an embodiment of the present disclosure.

FIG. 10 shows a schematic block diagram of an example power domain controller 1000 according to an embodiment of the present disclosure. The power domain controller is intended to represent various forms of digital computers, such as laptop computers, desktop computers, workstations, personal digital assistants, servers, blade servers, mainframe computers, and other suitable computers. The power domain controller also represents various forms of mobile devices, such as personal digital processing, cellular telephones, smart phones, wearable devices, and other similar computing devices. The components shown herein, their connections and relationships, and their functions, are by way of example, and are not intended to limit implementations of the disclosure described and/or claimed herein.

As shown in FIG. 10, the dynamic domain controller 1000 includes a computing unit 1001 that can perform various suitable actions and processes according to a computer program stored in a read-only memory (ROM) 1002 or a computer program loaded from a storage unit 1008 into a random access memory (RAM) 1003. In the RAM 1003, various programs and data required for the operation of the storage device 1000 are stored. The computing unit 1001, the ROM 1002, and the RAM 1003 are connected with each other through a bus 1004. An input/output (I/O) interface 1005 is also connected with the bus 1004.

Multiple components in the power domain controller 1000 are connected with the I/O interface 1005, including an input unit 1006, such as a keyboard and a mouse; an output unit 1007, such as various types of displays and speakers; a storage unit 1008, such as a magnetic disk and an optical disk; and a communication unit 1009, such as a network card, a modem and a wireless communication transceiver. The communication unit 1009 allows the device 1000 to exchange information/data with other devices through a computer network such as the Internet and/or various telecommunication networks.

The computing unit 1001 is various general and/or special purpose processing components with processing and computing capabilities. Some examples of computing unit 1001 include, but are not limited to, a central processing unit (CPU), a graphics processing unit (GPU), various specialized artificial intelligence (AI) computing chips, various computing units running machine learning model algorithms, digital signal processors (DSP), and any suitable processor, controllers and microcontrollers. The computing unit 1001 executes the above-described various methods and processes, for example, a driverless power supply control method. For example, in some embodiments, the driverless power supply control method is implemented as a computer software program tangibly embodied on a machine-readable medium, such as the storage unit 1008. In some embodiments, some or all of the computer programs are loaded into and/or arranged onto the power domain controller 1000 through the ROM 1002 and/or the communication unit 1009. When the computer program is loaded into the RAM 1003 and executed by the computing unit 1001, at least one step of the above-described driverless power supply control method is executed. Alternatively, in other embodiments, the computing unit 1001 is configured to execute a driverless power supply control method in any other suitable manner (e. g., through a firmware).

Figure 11:
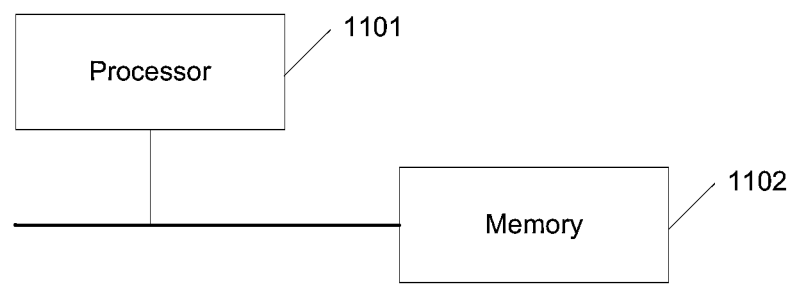
FIG. 11 is a structural schematic diagram of a power domain controller for implementing a driverless power supply control method according to another embodiment of the present disclosure.

According to an embodiment of the present disclosure, a power domain controller is further provided, as shown in FIG. 11, including:
at least one processor 1101;
a memory 1102 communicatively connected with the at least one processor 1101; and
The memory 1102 is configured to store an instruction executable by the at least one processor 1101, the instruction, when executed by the at least one processor 1101, enabling the at least one processor 1101 to execute the driverless power supply control method mentioned above.

According to an embodiment of the present disclosure, a non-transitory computer-readable storage medium storing computer instructions is further provided, and the computer instructions are used for enabling a computer to execute the driverless power supply control method mentioned above.

According to an embodiment of the present disclosure, a computer program product is further provided, including a computer program, and when executed by a processor, the computer program is used for implementing the driverless power supply control method mentioned above.

According to an embodiment of the present disclosure, a driverless vehicle is further provided, including the power domain controller mentioned above. The power domain controller in the driverless vehicle in an embodiment of the present disclosure may separately collect power supply state signals of the DCDC, the main storage battery, and the standby storage battery through data wires, and then determine, based on the power supply state signals, whether the DCDC, the main storage battery and the standby storage battery fail to work, and execute corresponding processing, thereby further reducing the failure probability of the power supply system, and improving the security of the power supply system.

Various embodiments of the systems and techniques described above herein are implemented in digital electronic circuitry, integrated circuitry, field programmable gate arrays (FPGAs), application specific integrated circuits (ASICs), application specific standard products (ASSPs), system on chips (SOCs), load programmable logic devices (CPLDs), computer hardware, firmware, software, and/or combinations thereof. These various embodiments include: implementing in at least one computer program executable and/or interpretable on a programmable system including at least one programmable processor; the programmable processor is a special-purpose or general-purpose programmable processor, may receive data and instructions from a storage system, at least one input device and at least one output device, and transmit the data and instructions to the storage system, the at least one input device and the at least one output device.

Program code for implementing the methodologies of the present disclosure is written in any combination of at least one programming languages. The program code is provided to a processor or controller of a general purpose computer, special purpose computer, or other programmable data processing apparatus, such that the program code, when executed by the processor or controller, causes the functions or operations specified in the flowchart and/or block diagrams to be implemented. The program code is executed entirely on the machine, partly on the machine, as a stand-alone software package partly on the machine and partly on the remote machine or entirely on the remote machine or the server.

In the context of the present disclosure, a machine-readable medium is tangible media that may contain or store a program for use by or in connection with an instruction execution system, apparatus, or device. The machine-readable medium is a machine-readable signal medium or a machine-readable storage medium. The machine-readable medium includes, but not limited to, an electronic, magnetic, optical, electromagnetic, infrared, or semiconductor system, apparatus, or device, or any suitable combination of the foregoing. More specific examples of machine-readable storage media include an electrical connection based on at least one wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

In order to provide for interaction with a user, the systems and techniques described herein are implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices are used for providing for interaction with a user. For example, feedback provided to a user is any form of sensory feedback (e.g., visual feedback, auditory feedback, or tactile feedback); and input from a user is received in any form, including acoustic input, speech input, or tactile input.

The systems and techniques described herein may be implemented in a computing system that includes a background component (e.g., as a data server), or that includes a middleware component (e.g., an application server), or that includes a front-end component (e.g., a user computer having a graphical user interface or a web browser through which a user may interact with an implementation of the systems and techniques described herein), or that includes any combination of such a background component, middleware component, or front-end component. The components of the system are interconnected by any form or medium of digital data communication (e.g., a communication network). Examples of communication networks include a local area network (LAN), a wide area network (WAN) and the Internet.

The computer system includes a client and a server. The client and the server are generally remote from each other and typically interact through a communication network. The client and the server relationships are generated by computer programs running on the respective computers and having a client-server relationship to each other.

It should be understood that the steps are reordered, added, or deleted by using the various forms of flow shown above. For example, the steps described in the present disclosure are executed in parallel, are executed sequentially, or are executed in a different order, as long as desired results of the technical solutions disclosed in the present disclosure can be achieved, which is not limited herein.

The above specific embodiments do not limit the scope of protection of the present disclosure. It will be apparent to those skilled in the art that various modifications, combinations, sub-combinations, and alterations are made depending upon design requirements and other factors. Any modifications, equivalent replacements, improvements and the like made within the spirit and principle of the present disclosure shall belong to the scope of protection of the present disclosure.

What is claimed is:

1. A driverless power supply system, comprising: a high-voltage battery box (1), a direct current converter (2), a main storage battery (3), a standby storage battery (4), a power domain controller (5) and an electrical load (6);
    the direct current converter (2) is respectively connected with the high-voltage battery box (1) and the electrical load (6) through wires;
    the main storage battery (3) is respectively connected with the direct current converter (2) and the electrical load (6) through wires;
    the standby storage battery (4) is respectively connected with the direct current converter (2) and the electrical load (6) through wires; and
    the power domain controller (5) is respectively connected with the direct current converter (2), the main storage battery (3) and the standby storage battery (4) through data wires;
    wherein the system further comprises an electrical box (11);
    the direct current converter (2), the main storage battery (3) and the standby storage battery (4) are respectively connected with a first end of the electrical box (11) through wires;
    the power domain controller (5) and the electrical load (6) are respectively connected with a second end of the electrical box (11) through wires, and the power domain controller (5) is connected with a third end of the electrical box (11) through data wires;
    the electrical box (11) is configured to, in response to any one of the direct current converter (2), the main storage battery (3) and the standby storage battery (4) failing to work, cutting off power supply to the electrical load having a non-safety function, and supplying power to the electrical load having a safety function.

2. The system as claimed in claim 1, wherein the system further comprises a main normally closed relay (7) and a standby normally closed relay (8);
    the main storage battery (3) is respectively connected with the direct current converter (2) and
    the electrical load (6) through the main normally closed relay (7);
    the standby storage battery (4) is respectively connected with the direct current converter (2) and the electrical load (6) through the standby normally closed relay (8);
    the power domain controller (5) is configured to supply power to the main normally closed relay (7) and the standby normally closed relay (8), so as to control the main normally closed relay (7) and the standby normally closed relay (8) to open;
    when the main normally closed relay (7) is opened, a connection between the main storage battery (3) and the direct current converter (2) is disconnected, and a connection between the main storage battery (3) and the electrical load (6) is also disconnected; and
    when the standby normally closed relay (8) is opened, a connection between the standby storage battery (4) and the direct current converter (2) is disconnected, and a connection between the standby storage battery (4) and the electrical load (6) is also disconnected.

3. The system as claimed in claim 1, wherein a main power sensor (9) is arranged on the main storage battery (3), and a standby power sensor (10) is arranged on the standby storage battery (4);
    the power domain controller (5) is respectively connected with the main power sensor (9) and
    the standby power sensor (10) through data wires.

4. The system as claimed in claim 3, wherein the main power sensor (9) is configured to collect the first power supply state signal of the main storage battery (3), and then transmits the first power supply state signal to the power domain controller (5) through the data wires; and the power domain controller (5) is configured to determine a power supply state of the main storage battery (3) according to the first power supply state signal.

5. The system as claimed in claim 3, wherein the standby power sensor (10) is configured to collect a second power supply state signal of the standby storage battery (4), and transmit the second power supply state signal to the power domain controller (5) through the data wires; and the power domain controller (5) is configured to determine the power supply state of the standby storage battery (4) according to the second power source state signal.

6. The system as claimed in claim 1, wherein the direct current converter (2) is configured to convert high-voltage electricity output by the high-voltage battery box (1) into low-voltage electricity, and transmits the low-voltage electricity to the electrical load (6).

7. The system as claimed in claim 1, wherein a positive pole of the main storage battery (3) and a positive pole of the standby storage battery (4) are connected with the electrical load (6), and a negative pole of the main storage battery (3) and a negative pole of the standby storage battery (4) are grounded.

8. The system as claimed in claim 1, wherein a positive pole of the main storage battery (3) and a positive pole of the standby storage battery (4) are connected with the direct current converter (2), and a negative pole of the main storage battery (3) and a negative pole of the standby storage battery (4) are grounded.

9. The system as claimed in claim 1, wherein the power domain controller (5) is configured to separately collect power supply state signals from the direct current converter (2), the main storage battery (3), and the standby storage battery (4) through the data wires, and determine, based on the power supply state signals, whether the direct current converter (2), the main storage battery (3), and the standby storage battery (4) fail to work.

10. A driverless power supply control method, applied to a power domain controller in the driverless power supply system, a direct current converter, a main storage battery and a standby storage battery are respectively connected with a first end of an electrical box through wires, the power domain controller and electrical load are respectively connected with a second end of the electrical box through wires and the power domain controller is connected with a third end of the electrical box through data wires, wherein the method comprises:
   detecting a power supply state of each of a plurality of batteries on a driverless vehicle, the plurality of batteries comprising the direct current converter, the main storage battery and the standby storage battery;
   in response to detecting that the power supply state of any one of the plurality of batteries is in a failure state, cutting off a power supply circuit of one battery, of which the power supply state is the failure state;
   wherein the method comprises cutting off power supply to the electrical load having a non-safety function, and supplying power to the electrical load having a safety function, in response to any one of the direct current converter, the main storage battery and the standby storage battery failing to work.

11. The method as claimed in claim 10, wherein when the driverless power supply system is arranged with a main normally closed relay and a standby normally closed relay, cutting off the power supply circuit of the one battery comprises:
   when the one battery is the main storage battery, supplying power to the main normally closed relay, so as to cut off a power supply circuit of the main storage battery;
   when the one battery is the standby storage battery, supplying power to a control unit of the standby normally closed relay, so as to cut off a power supply circuit of the standby storage battery.

12. The method as claimed in claim 10, wherein when a main power sensor is arranged on the main storage battery and a standby power sensor is arranged on the standby storage battery, detecting the power supply state of each of the plurality of batteries on the driverless vehicle comprises:
   acquiring a first power supply state signal collected by the main power sensor and a second power supply state signal collected by the standby power sensor; and
   respectively determining, according to the first power supply state signal and the second power supply state signal, power supply states of the main storage battery and the standby storage battery;
   the method further comprises:
   in response to determining that the power supply state of the main storage battery is a failure state, determining, according to a pre-stored correspondence between a power supply state signal and an action item, a first target action item corresponding to the first power supply state signal; and executing the first target action item; and
   in response to determining that the power supply state of the standby storage battery is a failure state, determining, according to the pre-stored correspondence between a power supply state signal and an action item, a second target action item corresponding to the second power supply state signal; and executing the second target action item.

13. The method as claimed in claim 12, wherein the method further comprises:
   in response to the first power supply state signal indicating that an output voltage of the main storage battery is lower than a preset voltage threshold, or the second power supply state signal indicating that an output voltage of the standby storage battery is lower than the preset voltage threshold, waking up the direct current converter, so as to charge the main storage battery and the standby storage battery through the direct current converter.

14. The method as claimed in claim 10, wherein when the driverless power supply system is arranged with an electrical box, the method further comprises:
   sending, according to a pre-stored corresponding first electrical load and second electrical load when the any one of the plurality of batteries does not work, a power supply cut-off instruction to the electrical box, so that the electrical box cuts off a power receiving circuit of the first electrical load according to the power supply cut-off instruction, and turns on a power receiving circuit of the second electrical load.

15. A power domain controller comprising:
   at least one processor;
   a memory communicatively connected with the at least one processor; wherein the memory is configured to store instructions executable by the at least one processor, the instructions, when executed by the at least one processor, enabling the at least one processor to execute the following steps:
   detecting a power supply state of each of a plurality of batteries on a driverless vehicle, the plurality of batteries comprising a direct current converter, a main storage battery and a standby storage battery;
   in response to detecting that the power supply state of any one of the plurality of batteries is in a failure state, cutting off a power supply circuit of one battery, of which the power supply state is the failure state; and
   cutting off power supply to the electrical load having a non-safety function, and supplying power to the electrical load having a safety function, in response to any one of the direct current converter, the main storage battery and the standby storage battery failing to work.

16. The power domain controller as claimed in claim 15, wherein when the driverless power supply system is arranged with a main normally closed relay and a standby normally closed relay, the instructions, when executed by the at least one processor, enabling the at least one processor to further execute the following steps:
   when the one battery is the main storage battery, supplying power to the main normally closed relay, so as to cut off a power supply circuit of the main storage battery;
   when the one battery is the standby storage battery, supplying power to a control unit of the standby normally closed relay, so as to cut off a power supply circuit of the standby storage battery.

17. The power domain controller as claimed in claim 15, wherein when a main power sensor is arranged on the main storage battery and a standby power sensor is arranged on the standby storage battery, the instructions, when executed by the at least one processor, enabling the at least one processor to further execute the following steps:

acquiring a first power supply state signal collected by the main power sensor and a second power supply state signal collected by the standby power sensor; and respectively determining, according to the first power supply state signal and the second power supply state signal, power supply states of the main storage battery and the standby storage battery;

in response to determining that the power supply state of the main storage battery is a failure state, determining, according to a pre-stored correspondence between a power supply state signal and an action item, a first target action item corresponding to the first power supply state signal; and executing the first target action item; and in response to determining that the power supply state of the standby storage battery is a failure state, determining, according to the pre-stored correspondence between a power supply state signal and an action item, a second target action item corresponding to the second power supply state signal; and executing the second target action item.

18. The power domain controller as claimed in claim 17, wherein the instructions, when executed by the at least one processor, enabling the at least one processor to further execute the following steps:

in response to the first power supply state signal indicating that an output voltage of the main storage battery is lower than a preset voltage threshold, or the second power supply state signal indicating that an output voltage of the standby storage battery is lower than the preset voltage threshold, waking up the direct current converter, so as to charge the main storage battery and the standby storage battery through the direct current converter.

19. The power domain controller as claimed in claim 15, wherein the instructions, when executed by the at least one processor, enabling the at least one processor to further execute the following steps:

sending, according to a pre-stored corresponding first electrical load and second electrical load when the any one of the plurality of batteries does not work, a power supply cut-off instruction to the electrical box, so that the electrical box cuts off a power receiving circuit of the first electrical load according to the power supply cut-off instruction, and turns on a power receiving circuit of the second electrical load.

\* \* \* \* \*